United States Patent

Kobayashi et al.

[15] 3,675,223

[45] July 4, 1972

[54] MAGNETIC MEMORY PLANE

[72] Inventors: Seihin Kobayashi; Michihiro Torii; Koichiro Suzuki, all of Shizuoka-ken, Japan

[73] Assignee: Fuji Denki Kagaki Kabushiki Kaisha, Tokyo, Japan

[22] Filed: Oct. 12, 1970

[21] Appl. No.: 79,926

[30] Foreign Application Priority Data

Oct. 15, 1969 Japan....................................44/81853

[52] U.S. Cl.................340/174 S, 340/174 AC, 340/174 CR, 340/174 DA, 340/174 DC, 340/174 GP, 340/174 NC, 340/174 PW, 340/174 WC, 340/174 M

[51] Int. Cl.......................................G11c 7/02, G11c 11/06

[58] Field of Search ................340/174 M, 174 CR, 174 PW, 340/174 WC, 174 AC, 174 DA, 174 S

[56] References Cited

UNITED STATES PATENTS

| | | | |
|---|---|---|---|
| 3,303,481 | 2/1967 | Kessler | 340/174 M |
| 3,397,394 | 8/1968 | Maeda | 340/174 PW |

OTHER PUBLICATIONS

IBM Technical Disclosure Bulletin; Vol. 6, No. 2, July 1963 Pgs. 71–72

*Primary Examiner*—James W. Moffitt
*Attorney*—Eliot S. Gerber

[57] ABSTRACT

A magnetic memory plane is divided into a plurality of sections each comprising a plurality of memory elements and a separate sense means. The improvement comprises a conductor provided between the adjacent sections and connected to a ground plane to form a closed electric circuit therewith.

7 Claims, 5 Drawing Figures

SEIHIN KOBAYASHI
MICHIHIRO TORII
KOICHIRO SUZUKI
INVENTORS
BY Eliot S. Gerke
ATTORNEY

SEIHIN KOBAYASHI
MICHIHIRO TORII
KOICHIRO SUZUKI

INVENTORS

BY Eliot S. Gerber
ATTORNEY

SEIHIN KOBAYASHI
MICHIHIRO TORII
KOICHIRO SUZUKI
INVENTORS

BY Eliot S. Gerber
ATTORNEY

SEIHIN KOBAYASHI
MICHIHIRO TORII
KOICHIRO SUZUKI
INVENTORS.

BY Eliot S. Gerber
ATTORNEY.

SEIHIN KOBAYASHI
MICHIHIRO TORII
KOICHIRO SUZUKI
INVENTORS.
BY Eliot S. Gerber
ATTORNEY.

MAGNETIC MEMORY PLANE

This invention relates to magnetic memory planes and more particularly to magnetic memory planes each divided into sections (which include bit planes, submatrices, and bit arrays) wherein at least a separate sense means is applied to each section.

Many of the difficulties encountered in high speed operation of data processing using magnetic core memory planes divided into a plurality of submatrices are due to a noise induced into the sense windings. The largest portion of the noise induced to the sense winding is generated by the inductive and electrostatic coupling of the magnetic cores energized through drive windings. The next largest portion of the noise induced to the sense winding is not noise generated from the same submatrix but noise that is generated by drive current in the adjacent submatrix.

The latter portion of the noise is generated by electrostatic coupling between parts of the sense windings that are close to the adjacent submatrix and a digit winding in said submatrix close to the sense winding parts. In a high-speed memory plane, in which a number of submatrices are simultaneously subjected to reading and writing operations, the latter noise is a source of trouble in such operations.

In order to reduce such electrostatic coupling between the submatrices, it is desirable to narrow the intervals between the cores in each submatrix through which the sense winding is threaded and also to widen the spaces between adjacent submatrices so as to widely separate the parts of the sense windings that are close to the adjacent submatrices from the digit windings in said submatrices. But, since there exists a limitation on the narrowing of the intervals of the arranged cores themselves, it is very difficult, in practice, to narrow the intervals of the sense windings threaded through the cores. On the other hand, to greatly widen the spaces between the submatrices is not acceptable from the viewpoint of the demand for high-speed memory planes which requires the memory planes to be smaller.

Those memory planes comprising a plurality of plated wire memories or flat film memories divided into a plurality of sections or bit arrays present a similar difficulty. The electrostatic coupling between adjacent sense-digit windings each being in the adjacent bit arrays generates noise.

An object of the present invention is therefore to reduce noise due to electrostatic coupling without narrowing the intervals between cores in each submatrix through which a sense winding is threaded and without greatly widening the spaces between submatrices.

For a better understanding of the invention, embodiments thereof shall be described, by way of example, with reference to the accompanying drawings, in which.

Figure 4:
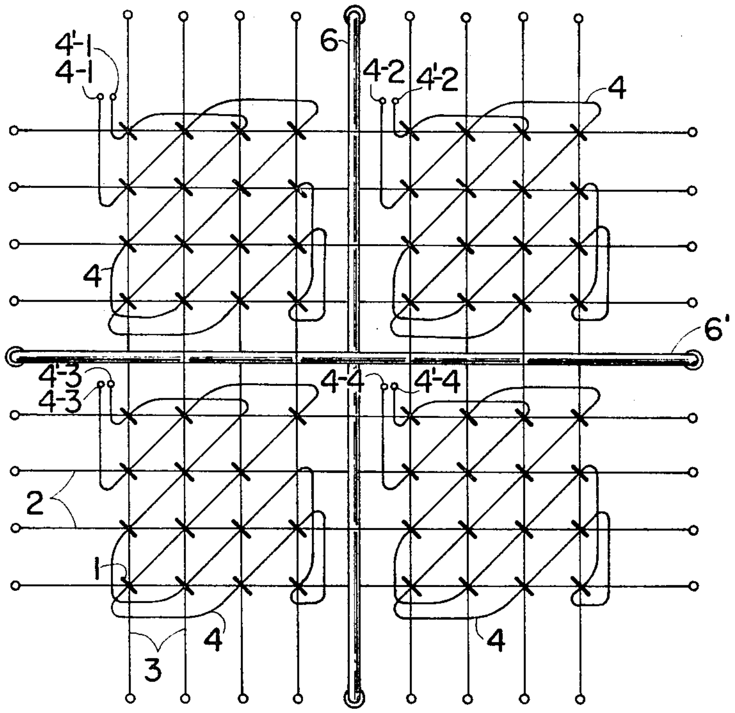
Figure 5:
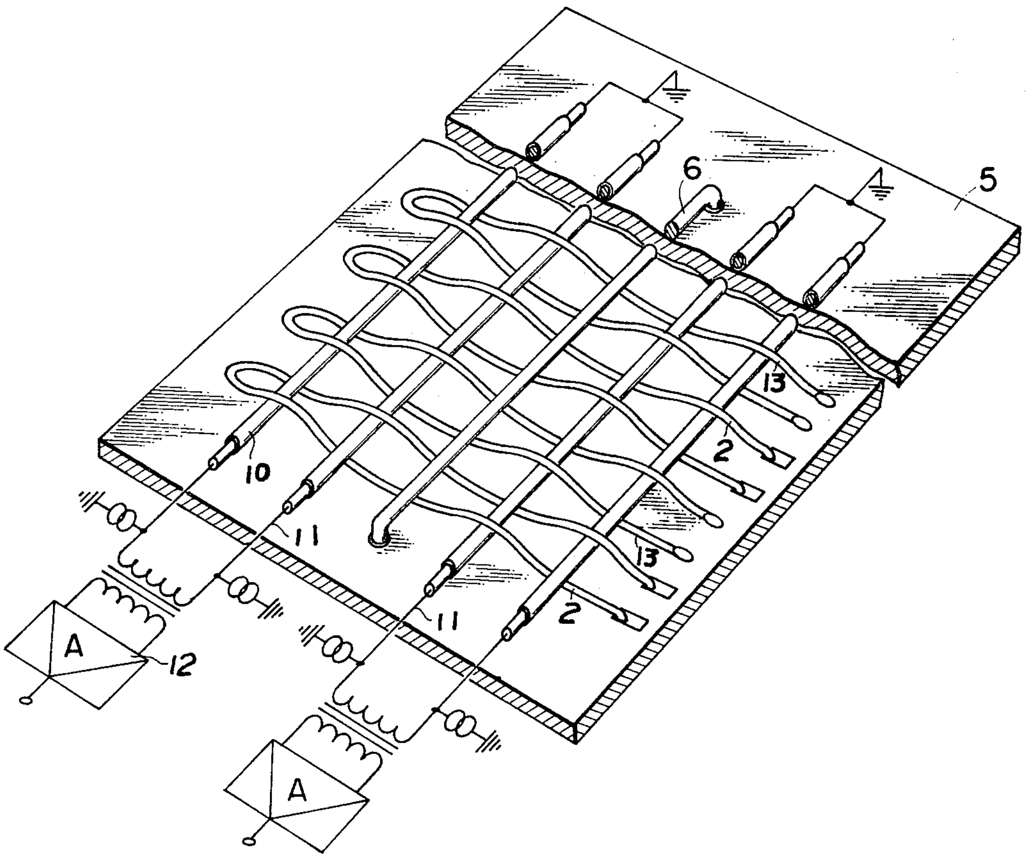

FIG. 4 is a top plan view showing a memory plane according to a second embodiment of the present invention, which memory plane is divided into four submatrices or mat planes each comprising a sense winding of diagonal configuration; and FIG. 5 is a perspective view showing a memory plane according to a third embodiment of the present invention, which memory plane is divided into two sections or bit arrays each comprising two wire memories.

Figure 1:
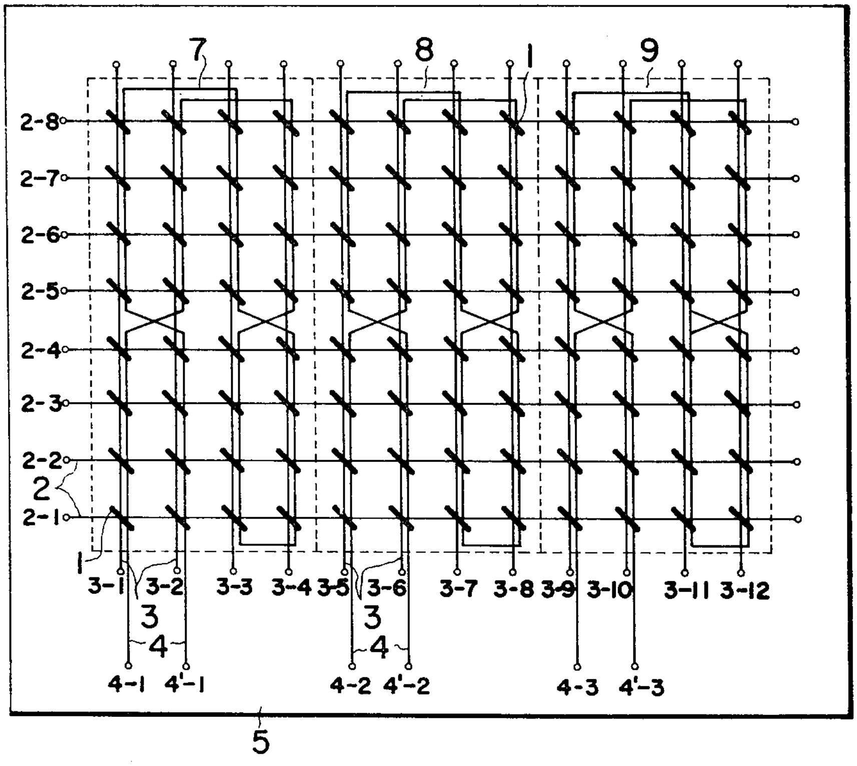
FIG. 1 PRIOR ART
FIG. 1 is a top plan view showing a conventional prior art magnetic core memory plane divided into three submatrices or bit planes each comprising a sense winding of rectangular configuration.

Referring to the conventional magnetic memory plane shown in FIG. 1, reference numeral 1 designates magnetic memory cores through which word windings 2 and digit windings 3 are threaded at right angles with each other. For example, the cores 1 may be small doughnut-shaped torroids of a ferrite material. Sense windings 4 are generally parallel to the digit windings 3 and extend transversely with respect to the word windings 2 to form a known rectangular configuration. Each of the sense windings 4–1, 4'–1; 4–2, 4'–2; and 4–3, 4'–3 couples the same number of magnetic cores in the same configuration, thus dividing the memory plane into three bit planes 7, 8 and 9.

In operation of such a memory plane, there arises a problem of a noise which will occur due to electrostatic coupling between the digit windings 3–4, 3–5, 3–8 and 3–9 and some parts of the sense windings 4–1, 4'–1; 4–2, 4'–2; and 4–3, 4'–3, which parts are close to the adjacent bit planes. In such a conventional memory plane, the spaces between the bit planes are as narrow as those of the magnetic memory cores, thereby resulting in great electrostatic coupling which causes the greater noise.

Figure 2:
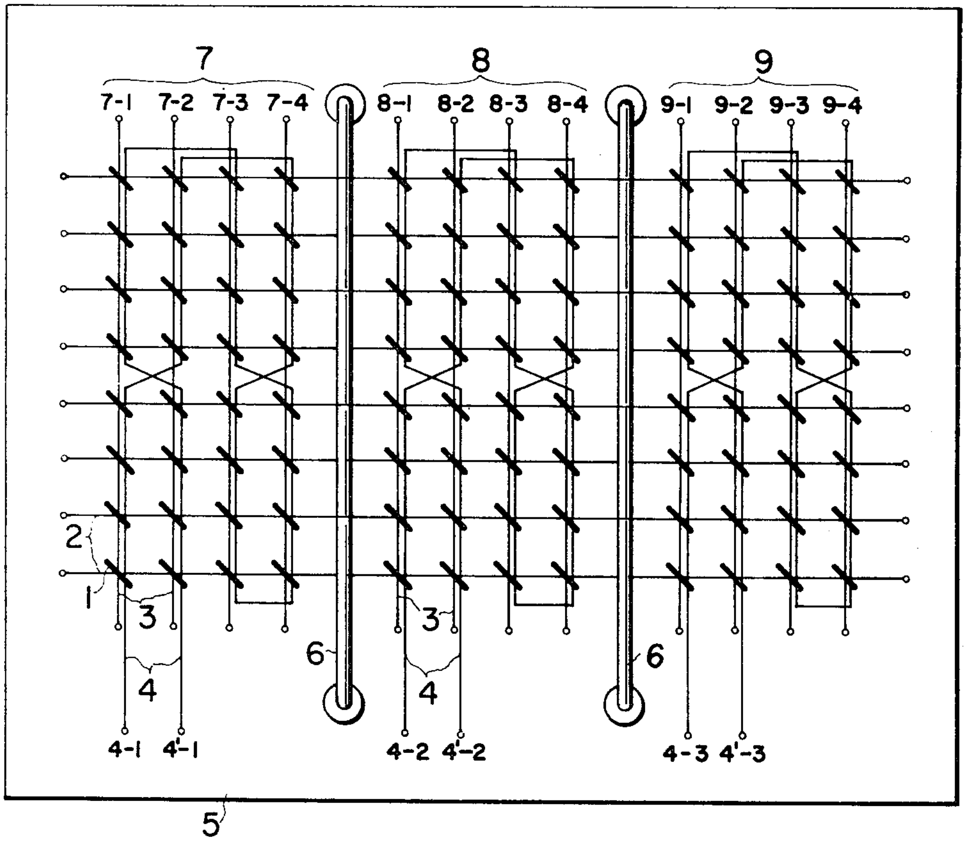
FIG. 2 is a top plan view showing a memory plane according to a first embodiment of the present invention, which memory plane is divided into three submatrices or bit planes each comprising a sense winding of the rectangular configuration.

Referring now to the embodiment of the present invention, FIG. 2 shows a magnetic core memory plane divided into three submatrices or bit planes 7, 8 and 9 and 96 magnetic cores 1. Each bit plane has 32 cores arranged in the conventional manner and is separated from each other with a space equal to twice as wide as that of the cores. The word windings 2 and digit windings 3 are threaded through each core 1 at right angles. Each of the sense windings 4–1, 4'–1; 4–2, 4'–2 and 4–3, 4'–3 is threaded through the cores in parallel to the digit windings 3 and transversely with respect to the word windings and couples all of the cores in one bit plane to form generally rectangular configuration.

According to the present invention, a conductor or conductive bar 6 is provided at substantially the center of the spaces between the bit planes 7, 8 and 9 and is connected at both ends to a ground plane 5, for example, a metal plate or wire grounded to the chassis or other electrical ground connection. Preferably, the conductor 6 is made of a material of low resistance and is made thicker than the word and the digit windings. In threading of the word windings 2, it is preferred to string the adjacent word windings alternately above and below the conductor 6.

According to the structure of the present invention, as the conductors 6 of low impedance are provided between the bit planes for screening and connected at both ends to the ground plane 5 to keep it to a fixed electric potential, the electrostatic coupling between the sense winding parts close to the adjacent bit planes and the digit windings in said bit planes close to said sense winding parts is eliminated, thus reducing the noise upon the sense windings. In addition, as the conductor 6 forms a closed electric circuit, together with the ground plane 5, it also prevents noise voltage induced to the conductor 6 from oscillation, which oscillation will cause secondary difficulties. Furthermore, as the space for providing the conductor 6 between the adjacent bit planes is sufficient if it is two or three times that between the adjacent cores, it does not prevent the structure from being a small sized memory plane.

Figure 3:
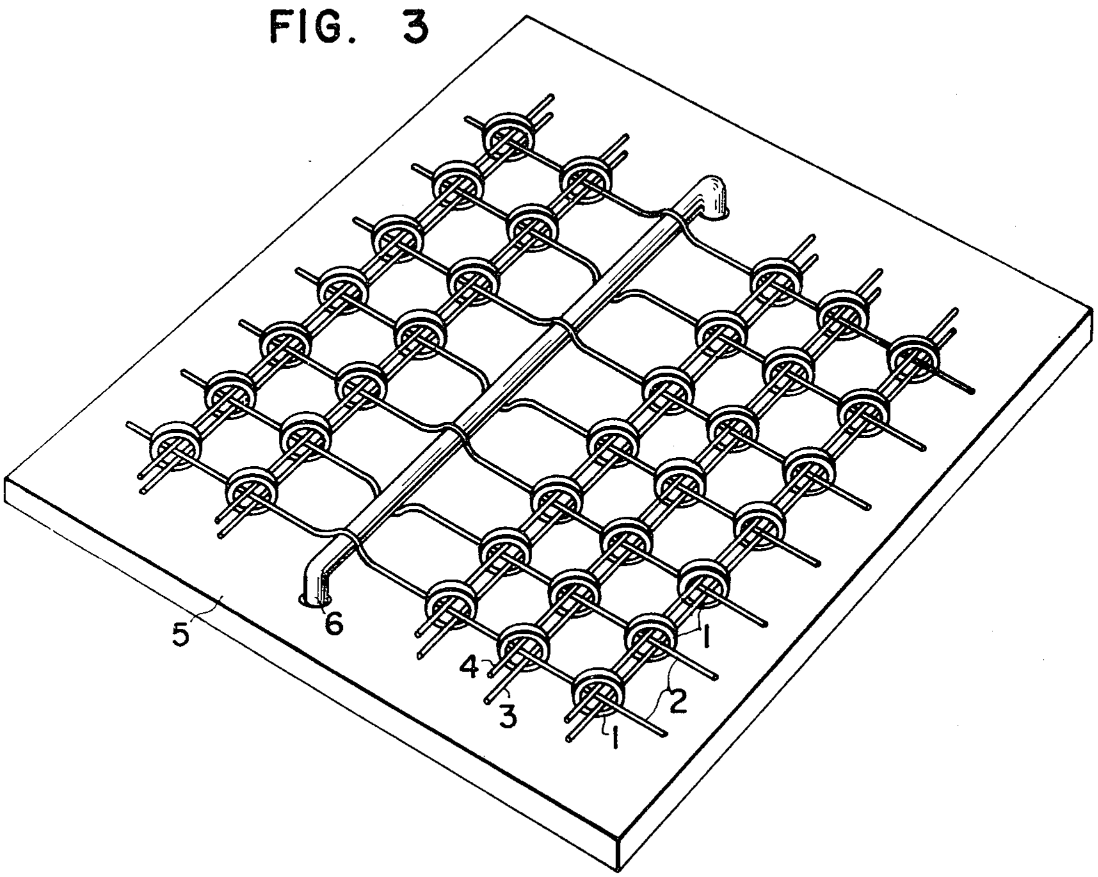
FIG. 3 is a perspective view showing, in enlarged scale, a part of the embodiment in FIG. 2.

As the adjacent word windings 2 are strung alternately above and below the conductor 6, shown in FIG. 3, the conductor also serves to maintain the prescribed position of the word windings 2 and thereby increases the mechanical strength and stability of the core memory plane.

FIG. 4 shows the second embodiment in which the memory plane is divided into four submatrices or mat planes by horizontal and vertical spaces on which two conductors 6 and 6', such as described in the first embodiment, are provided to intersect at right angles. Differing from the first embodiment, each mat plane in this embodiment comprises a sense winding strung in a diagonal configuration. The adjacent digit windings 3 are alternately strung above and below the conductor 6'.

Other structures of the first embodiment may be applied to those of the second embodiment with necessary modifications.

In the second embodiment, in addition to the effects of the first embodiment, the electrostatic coupling between the sense winding parts close to the adjacent mat plane and the word winding in said mat plane close to said sense winding parts is eliminated by the conductor 6'.

FIG. 5 shows another embodiment comprising four plated wire memories 10 divided into two bit arrays by a conductor 6. Each sense-digit winding 11 of the wire memories in a bit array is connected with each other to a sense amplifier 12. All of the wire memories 10 are strung by a plurality of word windings 2 and spacer windings 13 in a conventional manner. The conductor 6 is provided at the center between the bit arrays and connected at its both ends to the ground plane 5. In FIG. 5, although the conductor 6 is shown as being above the word and the spacer windings 2 and 13, it may, as an alternative construction, be strung above and below by these windings. In the construction of FIG. 5, the word and spacer windings are kept to the prescribed positions by the conductor 6.

In this third embodiment, in addition to the effects in the first embodiment, the electrostatic coupling between the two adjacent sense-digit windings each being in the adjacent bit array is eliminated by the conductor 6.

Although the present invention has been described with reference to the embodiments containing a small number of magnetic core memories or memory elements, it can be applied to a memory plane containing a great number of core memories or memory elements and to a memory plane containing flat film memories.

Furthermore, although each submatrix comprises only one sense winding, it can contain a plurality of sense windings.

Other modifications may be made, for example, the sense winding serves for digit windings, too, and inhibit windings are strung in the memory plane.

We claim:

1. In a magnetic memory plane comprising a plurality of magnetic cores divided into a plurality of submatrices with the dividing space being wider than the interval between the adjacent two cores, word and digit windings threaded through said cores and intersecting at right angles with each other, and a plurality of sense means in each submatrice being separated from the sense means in other submatrices, the improvement comprising a conductor provided between said adjacent submatrices at right angles with said word windings, and an electrical ground means positioned between said submatrices and connected to said conductor at both its ends, said word windings being strung above and below said conductor.

2. A magnetic memory plane as claimed in claim 1, wherein said conductor is rod shaped and made of material of low resistance, said conductor being connected at its both ends to said ground plane.

3. A magnetic memory plane as claimed in claim 1, wherein the space between the adjacent sections is more than twice as wide as that between the adjacent memory elements in the section.

4. A magnetic memory plane as claimed in claim 1, wherein said sense means serves as both sense winding and digit winding.

5. A magnetic memory plane as claimed in claim 1 wherein said sense means is a plurality of sense windings each threaded through the cores in each submatrix.

6. In a memory plane comprising a plurality of plated wire memories divided into a plurality of sections or bit arrays with the space between sections or arrays being wider than the intervals between the adjacent memories, word and spacer windings strung across said wire memories, and a plurality of digit-sense windings in which each bit array is connected with a sense amplifier, the improvement comprising a ground plane between said bit arrays and a conductor provided between said adjacent bit arrays and connected at both its ends to said ground plane, each of said word and spacer windings being strung above and below said conductor.

7. A magnetic memory plane as claimed in claim 6, wherein said magnetic cores are divided into submatrices of rows and columns, another conductor is provided between the adjacent submatrices at right angles with said digit windings, said ground means is positioned between said submatrices and connected to both ends of said conductor, and said digit windings are strung above and below said other conductor.

* * * * *